United States Patent [19]
Soukup et al.

[11] Patent Number: 6,140,383
[45] Date of Patent: Oct. 31, 2000

[54] PROCESS FOR MANUFACTURING RIGID POLYISOCYANURATE FOAM PRODUCTS

[75] Inventors: Thomas G. Soukup, Clearwater, Fla.; Steven G. Halterbaum, Highlands Ranch, Colo.

[73] Assignee: Johns Manville International, Inc., Denver, Colo.

[21] Appl. No.: 09/065,825

[22] Filed: Apr. 23, 1998

[51] Int. Cl.[7] .................................................. C08G 18/04
[52] U.S. Cl. ........................... 521/155; 264/45.3; 521/137
[58] Field of Search ........................... 264/45.3; 521/155, 521/137

[56] References Cited

U.S. PATENT DOCUMENTS 4,572,865  2/1986  Gluck et al. ........................... 428/309.9

Primary Examiner—John M. Cooney, Jr.
Attorney, Agent, or Firm—Robert D. Touslee

[57] ABSTRACT

A process for manufacturing an insulation board comprising a rigid polyisocyanurate foam core having two major surfaces and a facing material on at least one of the major surfaces, comprising (a) conveying a facing material along a production line for attachment to one major surface of the core; (b) applying a foam-forming mixture of polyisocyanurate to the facing material such that the mixture is applied along the entire width of the facing material; (c) optionally conveying a second facing material along the production line for attachment to the other major surface of the core; (d) conveying the facing material with applied foam-forming mixture into a laminator which comprises a gap for foam expansion and allowing the mixture to foam and expand to fill the gap within the laminator; and (e) curing the foam. The process provides excellent boardstock thickness control, minimal wasted densification at the foam/facer interface, greater compressive strength and high line speed.

20 Claims, 1 Drawing Sheet

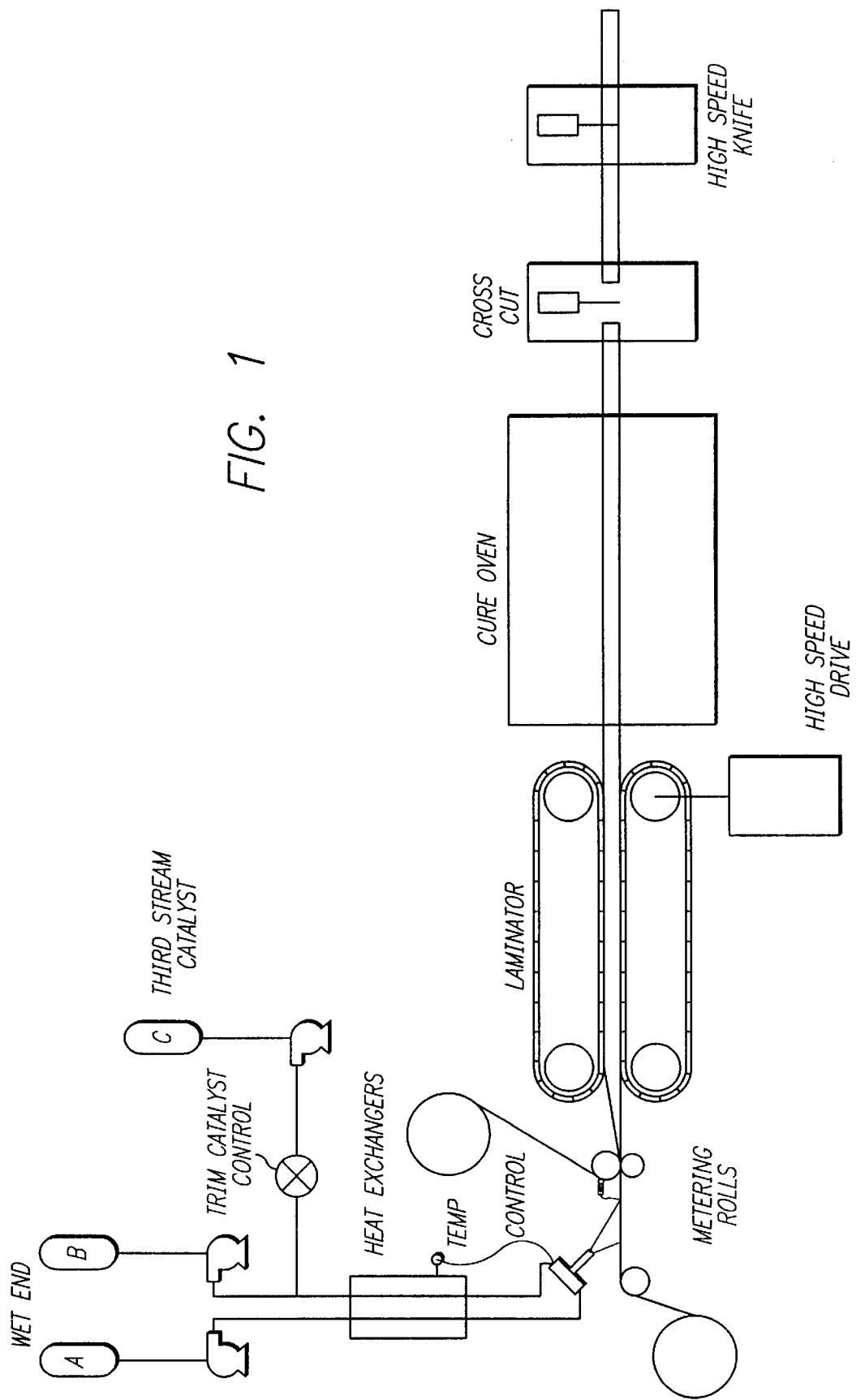

PROCESS FOR MANUFACTURING RIGID POLYISOCYANURATE FOAM PRODUCTS

FIELD OF THE INVENTION

The present invention relates to a process for manufacturing products comprising rigid polyisocyanurate foam.

DESCRIPTION OF THE RELATED ART

The manufacture of flexible faced, rigid polyisocyanurate foam insulation boardstock is commonly practiced by a process called restrained rise lamination. The restrained rise process relies on a combination of chemical component blending, precision metering, reactive component mixing and dispensing, use of a moving opposed platen pressure laminator, and use of dimensioning finishing equipment.

In the traditional restrained rise process, isocyanate ("Component A") is used as received. Component A is supplied by pump to a metering unit, or a metering pump. A premix ("Component B") containing polyol, expansion agent, catalyst and surfactant is prepared according to a defined formulation in a mix tank. Component B is also supplied by pump to a metering unit, or a metering pump. The metering pumps boost the pressure generally to 2000 to 2500 psi and control the flow of Components A and B to a precise ratio as determined by the desired chemistry. The pumps deliver Components A and B to at least one foam mixhead. Inside the mixhead, the Components A and B are impinged against each other at high pressure, which results in intimate mixing of the components.

The mixed chemicals exit the mixhead and are dispensed onto a moving bottom facing sheet in a plurality of discrete, liquid streams, in a quantity depending on the type and thickness of desired final boardstock product. The facing sheet carrying the chemical streams then enters a pressure laminator. The spacing, or gap, between the top and bottom platens of the laminator is set to approximately the final desired thickness of boardstock. The laminator temperature is adjusted typically to about 120 to 150° F. to insure that no heat is lost from the reacting, exothermic chemical mix, and to insure that the facings adhere well to the rising foam.

The mixed chemicals begin to react in about 5 to 10 seconds following mixing, expanding about 35 to 40 times in volume in the laminator and completing reaction in about 35 to 45 seconds. Laminator speed is adjusted to insure that complete reaction occurs within the pressure section of the laminator. The reaction rate is adjusted by catalyst modification to optimize chemical mixture "flow." Flow is a property of the reacting, rising foam by which expansion is controlled in such a manner that the foam properly expands both upward and sideways to fully fill the moving cavity defined by the laminator. This reactivity adjustment is essential to control both the overall properties of the final product and the cost of manufacture. Improper flow results in poor foam cell geometry which can deteriorate physical, thermal and flammability properties, and causes excessive densification of foam layers in contact with facings.

Rigid boardstock, with facing firmly attached, exits the laminator. This boardstock is trimmed to the desired final width and length. Finished product is conveyed to packaging equipment.

Much of the art in the manufacture of polyisocyanurate takes place where the mixed chemical streams are laid onto the bottom facer prior to entering the laminator. It is necessary that the chemical streams be placed and configured properly to insure that the potential negative effects of the rising foam (e.g., densification of foam at the facer interface through sideways expansion) are minimized. Proper chemical system catalysis is also essential to insure that the rising foam flows properly. Process line speed must be balanced with the foam reactivity so that flow is preserved and the finished boardstock has reached sufficient hardness to be further processed.

When done properly, acceptable foam physical, thermal and flammability properties are achieved. The density spread between core foam density and the in-place density, or IPD, is minimized (core foam density is defined as the measured density of the foam section of one half the thickness of the board taken from the center of the thickness; in-place density is defined as the total quantity of foam chemicals in a complete section of board including layers of surface densification and chemical that has been absorbed into the facers). Typical values for core foam density versus IPD for restrained rise process foam boardstock are 1.75 lb/ft$^3$ for core foam density and 1.95 lb/ft$^3$ for IPD. However, imbalance of laydown, catalyst and line speed can easily drive IPD well over 2.0 lb/ft$^3$.

Typical maximum line speed for a restrained rise process is approximately 1.5 feet/min for each foot of laminator length. That is, a 70 foot long laminator will produce acceptable quality boardstock at 105 feet/min at minimal cost; a speed of 2.0 feet/min per foot of laminator can be achieved on certain products with catalyst modification and careful attention to operating parameters. It is advantageous to increase line speed, and therefore production capacities, to gain more output from a given piece of equipment.

While mechanical limitations (i.e., finishing saws, conveyors and packaging equipment) can be modified to accommodate higher line speeds by conventional means, maintenance of proper foam properties and cost efficiencies present a more difficult problem. Increased line speed reduces the laminator dwell time (the time that the reacting foam is inside the pressure laminator) and must be altered to complete foam reaction more quickly. As the reaction time is reduce, chemical flow is also altered resulting in a condition commonly known as "lock up." When flow is lost, excessive densification at the foam/facer interface occurs, and cell geometry can be altered in a manner such that important properties, including compressive strength, dimensional stability, facer adhesion, insulation value and certain flammability characteristics, are deteriorated. It is therefore advantageous to remove or reduce the need for chemical flow as a component of the process.

Another known process for making flexible faced, rigid polyisocyanurate foam insulation boardstock is the free rise process. In this process, chemical laydown or distribution is accomplished through the use of a pair of matched, precision metering rolls. Chemicals are dispensed just upstream of the metering rolls. The gap between the rolls is adjusted to approximately $\frac{1}{35}$ to $\frac{1}{40}$ of the desired finished thickness of the boardstock. This small gap causes the dispensed chemical to form a "chemical bank" against the metering roll, forcing the chemical to spread across the full width of the bottom facer. A thin layer of mixed foam chemicals (approximately $\frac{1}{35}$ to $\frac{1}{40}$ of the desired finished thickness of the boardstock) is uniformly spread between the top and bottom facers. This composite then moves into a heated oven where the foam reaction is completed. Foam expands 35 to 40 times in volume and becomes sufficiently rigid for further processing. Final foam thickness is controlled by precision adjustment of the metering rolls. No mechanical restraint is utilized for thickness control, as with the restrained-rise process.

The free rise process does not require chemical flow. Dispensed and metered chemicals need only expand in the thickness dimension and not in the width dimension since the original laydown already accomplishes fall width application. By removing the need for flow, catalyst adjustments are made only to achieve complete reaction at the desired line speed without the negative impact of "locking up" the foam system. The free rise process is capable of speeds in excess of 250 feet/min.

An additional benefit of the free rise process is that density control is achieved within more efficient limits. Since sideways flow of expanding chemical does not occur, densification at the foam/facer interface is minimized. Density spreads of 1.70 lb/ft$^3$ for core foam density and 1.75 lb/ft$^3$ for IPD are routinely achieved.

Although the free rise process presents several significant advantages over the restrained rise process, there are some deficiencies of the free rise process that preclude its use for roof insulation boardstock manufacture. Since the free rise process does not utilize a mechanical means to control product thickness but instead relies on precision metering of chemicals and consistent expansion ratio, thickness variability becomes increasingly exaggerated as overall boardstock thickness is increased, resulting in boardstock that is unacceptable for field application. For example, thickness variation in a 4 inch product can easily be +/- 0.25 inches, which is unacceptable for many applications. Additionally, typical roof insulation facers are not uniform enough in thickness to provide precision surfaces in the metering roll process. Facer thickness variations will be exaggerated by 35 to 40 times in the final board. Lastly, the free rise process does not employ a mechanical means of foam width formation resulting in excessive waste through edge trim losses. These losses increase as the product thickness increases.

In view of the disadvantages of the prior art processes, there is a need for an improved process for the manufacture of flexible faced, rigid polyisocyanurate foam insulation boardstock.

SUMMARY OF THE INVENTION

The present invention is directed to a process for the manufacture of flexible faced, rigid polyisocyanurate foam insulation boardstock which provides excellent boardstock thickness control, minimal wasted densification at the foam/facer interface, improved product properties and high line speed.

Thus, in one aspect, the present invention provides a process for manufacturing an insulation board comprising a rigid polyisocyanurate foam having two major surfaces and a facing material on at least one of the major surfaces, the method comprising:

(a) conveying a facing material along a production line for attachment to one major surface of the foam;

(b) applying a foam-forming mixture of polyisocyanurate to the facing material in a manner comprising spreading the mixture with a spreading means in the direction of the width of the facing material;

(c) optionally conveying a second facing material along the production line for attachment to the other major surface of the foam;

(d) conveying the facing material with applied foam-forming mixture into a laminator which comprises a gap for foam expansion and allowing the mixture to foam and expand to fill the gap within the laminator; and (e) curing the foam.

BRIEF DESCRIPTION OF THE DRAWINGS

FIG. 1 illustrates a production line used to conduct the process according to the invention for making flexible faced, rigid polyisocyanurate foam.

DETAILED DESCRIPTION OF THE PREFERRED EMBODIMENTS

The present invention provides a process for the manufacture of flexible faced, rigid polyisocyanurate foam insulation boardstock. By the process, a foam-forming mixture of polyisocyanurate is applied to a facing material, spread in the direction of, and preferably along the entire width of the facing material, and the facing material with applied foam-forming mixture is then conveyed into a laminator which comprises a gap for foam expansion. The mixture is allowed to foam and expand to fill the gap within the laminator, and the foam is cured. Optionally, facing material is attached to both sides of the core of polyisocyanurate foam. Facing materials may include coated or uncoated paper, glass or other fiber mat, gypsum, oriented strandboard, or synthetic sheet material.

An important feature of the present invention is that it eliminates the need for "flow" of the foam-forming mixture of polyisocyanurate in the direction of the product width. Application of the foam-forming mixture over the entire width of the facing material contributes to the lack of need for flow. Such application is accomplished, for example, by use of a metering device, such as a metering roll. The present invention encompasses, however, any manner of applying the foam-forming mixture along the entire width of the facing material.

Use of the proper catalyst system is another factor which contributes to the lack of need for flow. Catalyst systems used in conventional restrained rise processes typically are binary or ternary blends of tertiary amine (e.g., PMDETA, TMR-30 or DMEA) and one or more potassium organo salts (e.g., potassium octoate and/or potassium acetate). In the restrained-rise process, the ratios of the catalysts are set to achieve fast initiation of reaction ("cream" time) and proper placement of "string gel" time to ensure proper "chemical flow," and sufficient completion of reaction prior to the boardstock exiting the pressure section of the laminator ("firm" time). Further discussion of restrained rise catalyst systems can be found, e.g., in U.S. Pat. No. 5,252,625, which is incorporated herein by reference. Line speed is important in the restrained rise process, since the catalyst system is designed to achieve the best flow and therefore the most efficient use of chemicals, yet it must yield foam sufficiently cured to be further processed after leaving the laminator. Line speed is therefore limited since, as catalyst is increased to complete cure more quickly, gel time is also reduced which reduces flow and increases product cost through excessive densification.

By the present invention, on the other hand, the expanding chemicals do not need to move sideways to fill the full width of the facing material because the foam-forming mixture is initially applied to the facing material and spread at least partially to remove at least a portion of the gaps between streams in the machine direction, and preferably spread along that entire width, with minimal or no gaps remaining, as the facing with foam-forming mixture thereon is conveyed to the restrained-rise laminator.

Larger amounts of catalyst can therefore be added to complete cure of the foam very quickly, once in the laminator. However, use of a spreading means, e.g., a metering roll will cause a hold up of chemicals in front of the roll (i.e., a "chemical bank"). In such instances the cream time must be delayed to avoid expansion of the foam in the chemical bank. Even though additional catalyst can be added to cure the foam faster in the laminator, such catalysts generally also decrease the cream time.

Accordingly, in comparison to the restrained rise process, catalyst systems used in the present invention generally provide a long cream time, and slightly delayed string gel to provide only minimal chemical flow, and a rapid cure or firm time. With the practice of the present invention, typical foam reactivities (e.g., measured upon exit from a high pressure foam mixhead) are a cream time of about 18–20 second, a gel time of about 28–30 seconds, and a firm time less than about 35 seconds. Catalyst may be provided in a supply containing the polyol ("Component B"), and/or as a separate component ("trim component") for addition to the foam-forming mixture.

Examples of catalyst systems which can be used in the present invention include:

Catalyst A:
5.0 parts per hundred of polyol (pphp) of a solution of potassium octoate in diethylene glycol (15% potassium; Hexcem 977 from OMG)

Catalyst B:
0.5 pphp of a solution of potassium acetate in diethylene glycol (10% potassium;
Catalyst 1123 from OMG)
2.0 pphp Hexcem 977
4.0 pphp Curithane 52 (from Air Products)

Catalyst C:
1.25 pphp Hexcem 977
2.5 pphp Dabco TMR-2 (from Air Products)

In conventional restrained rise processes, chemical operating temperatures (e.g., measured at the exit from a high pressure foam mixhead) are about 75–95° F. However, cream time is lessened by high temperature. In accordance with the present invention, it is therefore desirable to operate with colder chemicals to delay cream time, for example in use with a metering roll. Preferred chemical operating temperatures in the present invention are about 60–75° F. Control of chemical temperature is advantageously accomplished through the use of efficient heat exchangers placed downstream of metering pumps and as close as possible to foam mixheads, preferably sensing and maintaining precise temperature control at the mixhead.

In conventional restrained rise processes, typical maximum line speeds are about 1.5 feet per minute (fpm) for each foot in length of the pressure section of the laminator. For example, a 70 feet long laminator optimally runs at about 105 fpm. Catalyst system adjustment with careful distribution of chemicals and use of smooth facings can extend this range to about 2.0 fpm per foot of laminator (e.g., a 70 foot laminator would run at about 140 fpm).

Since the present invention removes concerns for chemical flow, line speeds are ultimately only limited by the ability to catalyze the foam in such a manner that the residence time (i.e., the time that the foam is in the pressure section of the laminator) is sufficient to provide enough firmness for further processing (e.g., cutting and packaging), and to ensure that no further expansion of the board occurs (post growth). In accordance with the present invention, use of a metering roll and appropriate catalyst system can thus provide line speeds up to about 2.5 fpm per foot of laminator (i.e., about 175 fpm for a 70 foot laminator).

Line speeds above 2.5 fpm per foot of laminator can be achieved with additional, non-pressurized residence time to ensure that the surfaces of the board (i.e., the interface of facing with foam core) are cured sufficiently to bind the facings firmly in place. Addition of a non-restraining hot air circulating oven (i.e., a post-cure oven) at the exit of the laminator can be used to provide additional heated residence time. Oven length can be equal, for example, to about the length of the pressure laminator. Line speeds of up to about 3.0–3.5 fpm per foot of laminator can be achieved with this embodiment.

Typical laminator temperatures, measured on the platen surface, range from about 110° F. for 4 inch thick board to about 160° F. for ½ inch thick board. A temperature of about 200–250° F. is preferred for the post-cure oven, if present.

Since the present invention involves the use of a restrained rise laminator, maximum thickness variation of insulation board made according to the invention is typically less than about +/−0.08 inches, most typically about +/−0.06 inches at all final product thickness.

In conventional restrained rise processes, core foam densities of the finished insulation board typically range from 1.70 to 1.75 pounds per cubic foot (pcf). In place density (IPD) is significantly higher due to densification at the foam/facer interface caused by sideways movement of the expanding chemicals (i.e., chemical flow). This densification is greater with thinner product. Thus, a 1 inch thick board with a core density of 1.70 pcf will generally have an IPD of about 2.00 pcf; and a 2 inch thick board with the same core density will have an IPD of about 1.90 pcf, and a 4 inch thick board will have an IPD of about 1.85 pcf. These high IPD's do not contribute to the performance of the product, but add significant cost. The present invention employs a restrained rise laminator which requires some "packing" (slight overfill of the laminator) to function as a thickness control. Therefore, the present invention generally provides an IPD of about 1.75 to 1.85 pcf for a core foam density of about 1.70 to 1.75 pcf, regardless of product thickness. The present invention is generally applicable for the manufacture of any flexible faced, rigid polyisocyanurate foam insulation boardstock described in the prior art.

In the manufacture of rigid polyisocyanurate foams, according to the present invention, two preformulated components are used, commonly called the A-component and the B-component. Typically, the A-component contains the isocyanate compound that must be reacted with the polyol of the B-component to form the foam, and the balance of the foam-forming ingredients are distributed in these two components or in yet another component or components.

In the broadest aspects of the present invention, any organic polyisocyanate can be employed in the preparation of the rigid polyisocyanurate foams. The organic polyisocyanates which can be used include aromatic, aliphatic and cycloaliphatic polyisocyanates and combinations thereof. Such polyisocyanates are described, for example, in U.S. Pat. Nos. 4,795,763, 4,065,410, 3,401,180, 3,454,606, 3,152,162, 3,492,330, 3,001,973, 3,394,164 and 3,124,605, all of which are incorporated herein by reference.

Representative of the polyisocyanates are the diisocyanates such as m-phenylene diisocyanate, toluene-2,4-diisocyanate, toluene-2,6-diisocyanate, mixtures of 2,4- and 2,6-toluene diisocyanate, hexamethylene- 1,6-diisocyanate, tetramethylene- 1,4-diisocyanate, cyclohexane- 1,4-diisocyanate, hexahydrotoluene 2,4- and 2,6-diisocyanate, naphthalene- 1,5-diisocyanate, diphenyl methane-4,4'-diisocyanate, 4,4'-diphenylenediisocyanate, 3,3'-dimethoxy-4,4'-biphenyl-diisocyanate, 3,3'-dimethyldiphenylmethane-4,4'-diisocyanate; the triisocyanates such as 4,4',4'-triphenylmethane-triisocyanate, polymethylenepolyphenyl isocyanate, toluene-2,4,6-triisocyanate; and the tetraisocyanates such as 4,4'-dimethyldiphenylmethane-2,2',5,5'-tetraisocyanate.

Prepolymers may also be employed in the preparation of the foams of the present invention. These prepolymers are prepared by reacting an excess of organic polyisocyanate or mixtures thereof with a minor amount of an active hydrogen-containing compound as determined by the well-known Zerewitinoff test, as described by Kohler in "Journal of the American Chemical Society," 49, 3181(1927). These compounds and their methods of preparation are well known in the art. The use of any one specific active hydrogen compound is not critical hereto, rather any such compound can be employed in the practice of the present invention.

Preferred isocyanates used according to the present invention include Mondur 489 (Bayer), Rubinate 1850 (ICI), Luprinate M70R (BASF) and Papi 580 (Dow). Isocyanate indices greater than about 200 are preferred, particularly from about 225 to about 325. In addition to the polyisocyanate, the foam-forming formulation also contains an organic compound containing at least 1.8 or more isocyanate-reactive groups per molecule. Preferred isocyanate-reactive compounds are the polyester and polyether polyols. Such polyester and polyether polyols are described, for example, in U.S. Pat. No. 4,795,763.

The polyester polyols useful in the invention can be prepared by known procedures from a polycarboxylic acid or acid derivative, such as an anhydride or ester of the polycarboxylic acid, and a polyhydric alcohol. The acids and/or the alcohols may be used as mixtures of two or more compounds in the preparation of the polyester polyols.

The polycarboxylic acid component, which is preferably dibasic, may be aliphatic, cycloaliphatic, aromatic and/or heterocyclic and may optionally be substituted, for example, by halogen atoms, and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; pyromellitic dianhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid; terephthalic acid dimethyl ester and terephthalic acid-bisglycol ester.

Any suitable polyhydric alcohol may be used in preparing the polyester polyols. The polyols can be aliphatic, cycloaliphatic, aromatic and/or heterocyclic, and are preferably selected from the group consisting of diols, triols and tetrols. Aliphatic dihydric alcohols having no more than about 20 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like may also be used. Moreover, the polycarboxylic acid(s) may be condensed with a mixture of polyhydric alcohols and amino alcohols.

Examples of suitable polyhydric alcohols include: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane; 2-methyl-1,3-propane diol; glycerin; trimethylolpropane; trimethylolethane; hexane triol-(1,2,6); butane triol-(1,2,4); pentaerythritol; quinitol; mannitol; sorbitol; formitol; α-methyl-glucoside; diethylene glycol; triethylene glycol; tetraethylene glycol and higher polyethyleneglycols; dipropylene glycol and higher polypropylene glycols as well as dibutylene glycol and higherpolybutylene glycols. Especially suitable polyols are oxyalkylene glycols, such as diethylene glycol, dipropylene glycol, triethylene glycol, tripropylene glycol, tetraethylene glycol, tetrapropylene glycol, trimethylene glycol and tetramethylene glycol.

Particularly preferred polyester polyols include Stepanpol PS2352 (Stepan) and Terate 2541 (Hoechst Celanese). Preferred amounts of the polyester polyols are consistent with isocyanate indices greater than 200, preferably between about 225 and 325.

Polyether polyols useful according to the present invention include the reaction products of a polyfunctional active hydrogen initiator and a monomeric unit such as ethylene oxide, propylene oxide, butylene oxide and mixtures thereof, preferably propylene oxide, ethylene oxide or mixed propylene oxide and ethylene oxide. The polyfunctional active hydrogen initiator preferably has a functionality of 2–8, and more preferably has a functionality of 3 or greater (e.g., 4–8).

A wide variety of initiators may be alkoxylated to form useful polyether polyols. Thus, for example, poly-functional amines and alcohols of the following type may be alkoxylated: monoethanolamine, diethanolamine, triethanolamine, ethylene glycol, polyethylene glycol, propylene glycol, hexanetriol, polypropylene glycol, glycerine, sorbitol, trimethylolpropane, pentaerythritol, sucrose and other carbohydrates. Such amines or alcohols may be reacted with the alkylene oxide(s) using techniques known to those skilled in the art. The hydroxyl number which is desired for the finished polyol would determine the amount of alkylene oxide used to react with the initiator. The polyether polyol may be prepared by reacting the initiator with a single alkylene oxide, or with two or more alkylene oxides added sequentially to give a block polymer chain or at once to achieve a random distribution of such alkylene oxides. Polyol blends such as a mixture of high molecular weight polyether polyols with lower molecular weight polyether polyols can also be employed.

Any suitable blowing agent can be employed in the foam compositions of the present invention. In general, these blowing agents are liquids having a boiling point between minus 50° C. and plus 100° C. and preferably between 0° C. and 50° C. The preferred liquids are hydrocarbons or halohydrocarbons such as chlorinated and fluorinated hydrocarbons. Suitable blowing agents include HCFC-141b (1-chloro-1,1-difluoroethane), HCFC-22 (monochlorodifluoromethane), HFC-245 fa (1,1,1,3,3-pentafluoropropane), HFC-134a (1,1,1,2-tetrafluoroethane), HFC-365mfc (1,1,1,3,3-pentafluorobutane), cyclopentane, normal pentane, isopentane, LBL-2(2-chloropropane), trichlorofluoromethane, $CCl_2FCClF_2$, $CCl_2FCHF_2$, trifluorochloropropane, 1-fluoro-1,1-dichloroethane, 1,1,1-trifluoro-2,2-dichloroethane, methylene chloride, diethylether, isopropyl ether, methyl formate, carbon dioxide and mixtures thereof.

The foams also can be produced using a froth-foaming method, such as the one disclosed in U.S. Pat. No. 4,572,865. In this method, the frothing agent can be any material which is inert to the reactive ingredients and is easily vaporized at atmospheric pressure. The frothing agent advantageously has an atmospheric boiling point of −50° to 10° C., and includes carbon dioxide, dichlorodifluoromethane, monochlorodi fluoromethane, trifluoromethane, monochlorotrifluoromethane, monochloropentafluoroethane, vinylfluoride, vinylidenefluoride, 1,1-difluoroethane, 1,1,1-trichlorodifluoroethane, and the like. A higher boiling blowing agent is desirably used in conjunction with the frothing agent. The blowing agent is a gaseous material at the reaction temperature and advantageously has an atmospheric boiling point ranging from about 10° to 80° C. Suitable blowing agents include trichloromonofluoromethane, 1,1,2-trichloro-1,2,2-trifluoroethane, acetone, pentane, and the like. In the froth-foaming method, the foaming agents, e.g., trichlorofluoromethane blowing agent or combined trichlorofluoromethane blowing agent and dichlorodifluoromethane frothing agent, are employed in an amount sufficient to give the resultant cured foam the desired bulk density which is generally between 0.5 and 10, preferably between 1 and 5, and most preferably between 1.5 and 2.5, pounds per cubic foot.

The foaming agents generally comprise from 1 to 30, and preferably comprise from 5 to 20 weight percent of the composition. When a foaming agent has a boiling point at or below ambient, it is maintained under pressure until mixed with the other components. Alternatively, it can be maintained at subambient temperatures until mixed with the other components. Mixtures of foaming agents can be employed.

Any suitable surfactant can be employed in the foams of this invention, including silicone/ethylene oxide/propylene oxide copolymers. Examples of surfactants useful in the present invention include, among others, polydimethylsiloxane-polyoxyalkylene block copolymers available from Witco Corporation under the trade names "L-5420", "L-5340", and Y10744; from Air Products under the trade name "DC-193"; from Goldschmidt under the name, Tegostab B84PI; and Dabco DC9141. Other suitable surfactants are those described in U.S. Pat. Nos. 4,365,024 and 4,529,745. Generally, the surfactant comprises from about 0.05 to 10, and preferably from 0.1 to 6, weight percent of the foam-forming composition.

Facings for use in the present invention include any flat, sheet material suitable to the required end application of the final board product. At least the upper facer must be flexible enough to be wrapped tightly around a metering roll. Facers must also be flat enough to not significantly alter the small gap between metering rolls. Such materials include aluminum foil/kraft paper laminations, bare aluminum foil, paper roof insulation facings, and coated glass fiber mats. A facer, as used herein, may also include oriented strandboard or gypsum, in which case such rigid material is conveyed to the laminator, and foam-forming mixture is preferably applied directly thereon.

The examples below illustrate typical experimental protocols which can be used to manufacture flexible faced, rigid polyisocyanurate foam insulation boardstock according to the present invention. Such examples are provided by way of illustration and not by way of limitation.

EXAMPLES

The following example describes application of the present invention, including the metering roll embodiment:

A chemical premix (Component B) was prepared in the batch tank to the following formulation:

| | |
|---|---|
| Terate 2541 polyol | 100.00 pbw |
| Hexcem 977 catalyst | 0.62 |
| Dabco TMR-2 catalyst | 1.25 |
| Tegostab B84PI surfactant | 2.00 |
| Water | 0.50 |
| HCFC-141b | 36.00 |

The catalyst added to Component B was half of the required quantity. The remaining catalyst was added as a separate component or "trim" component.

A catalyst blend (Component C or "trim component") was prepared to the following formulation and placed in the Component C supply tank:
Hexcem 977 0.62 pbw
Dabco TMR-2 1.25

Component A is Rubinate 1850 isocyanate as received.

Components A and B were pumped in metered quantities (ratio of A:B maintained at 1.23:1 ) at pressures of about 2000 psi to a high pressure impingement foam mixhead. Component C was metered at high pressure (about 2500 psi) and injected into the Component B stream immediately upstream of the mixhead. Level was adjusted to achieve desired reactivity.

The foam forming mixture was deposited onto the bottom facing sheet immediately before the metering rolls. The gap between the metering rolls was adjusted to about 1/35th of the final desired thickness of the board being manufactured. In this example, 1.0 inch residential sheathing was being made and the gap was set to 0.029 inches between the facers. Chemical component temperatures were adjusted to 65–70° F. A "bank" of mixed chemicals was created against the metering roll gap extending the full width (48 inches) of the final product. Laminator temperature was adjusted to about 150° F.

Line speed was increased to the point where full product thickness and width were achieved. Speed settled in at about 120 fpm. Using conventional restrained rise processing techniques, line speed would have been about 110 fpm. Board was very firm with excellent flatness and facer adhesion.

Densities were measured on the product from this production trial. Core foam density was found to be 1.74 pcf and IPD was 1.82 pcf (standard product has a core foam density of about 1.70 pcf with an IPD of about 1.90 pcf). Compressive strength was measured at 34 psi (standard product measures 18–20 psi). This represents a significant improvement. All other physical and thermal properties were found to be equivalent to product manufactured by conventional means.

While the invention has been described in detail and with reference to specific embodiments thereof, it will be apparent to one skilled in the art that various changes and modifications can be made therein without departing from the spirit and scope thereof.

We claim:

1. A process for manufacturing an insulation board comprising a rigid polyisocyanurate foam having two major surfaces and a facing material on at least one of the major surfaces, the method comprising:

(a) conveying a facing material along a production line for attachment to one major surface of the foam;

(b) applying a foam-forming mixture of polyisocyanurate to the facing material in a manner comprising spreading the mixture with a spreading means in the direction of the width of the facing material;

(c) optionally conveying a second facing material along the production line for attachment to the other major surface of the foam;

(d) conveying the facing material with applied foam-forming mixture into a restrained rise laminator which comprises a gap for foam expansion and allowing the mixture to foam and expand to fill the gap within the laminator; and (e) curing the foam.

2. The process according to claim 1 wherein the foam-forming mixture is spread along the entire width of the facing material.

3. The process according to claim 1, wherein temperature of the foam-forming mixture is adjusted prior to application to the facing material.

4. The process according to claim 1, wherein temperature of the foam-forming mixture is controlled by passing at least part of the components to be mixed through a heat exchanger prior to application to the facing material.

5. The process according to claim 1, wherein the line speed is at least 2.0 feet/min per foot of laminator.

6. The process according to claim 1, wherein the line speed ranges from about 2.0 to about 2.5 feet/min per foot of laminator.

7. The process according to claim 1, wherein the insulation board is conveyed through a post-cure oven after exiting the laminator.

8. The process according to claim 1, wherein the line speed ranges from about 2.5 to about 3.0 feet/min per foot of laminator.

9. The process according to claim 1, wherein the line speed ranges from about 3.0 to about 3.5 feet/min per foot of laminator.

10. The process according to claim 1 which produces insulation board having a core foam density ranging from about 1.70 to about 1.75 lb/ft$^3$ and an in-place density ranging from about 1.75 to about 1.85 lb/ft$^3$.

11. The process according to claim 1, wherein the cured insulation board varies in thickness by no more than +/−0.080 inches.

12. The process according to claim 1, wherein a metering device is used to apply the foam-forming mixture to the facing material.

13. The process according to claim 12, wherein the metering device is a set of metering rolls.

14. The process according to claim 1, wherein the foam-forming mixture comprises a polyisocyanate and a polyester polyol.

15. The process according to claim 1, wherein the foam-forming mixture comprises a polyisocyanate and a polyether polyol.

16. The process according to claim 1, wherein the foam-forming mixture is applied at a temperature ranging from about 60 to 75° F.

17. The process according to claim 1, wherein the temperature of the foam-forming mixture is controlled by a heat exchanger downstream of at least one metering pump supplying foam-forming mixture components, prior to application to the facing material.

18. The process according to claim 1, wherein the rigid foam has a compressible strength greater than 20 psi.

19. The process according to claim 1, wherein the rigid foam has a compressive strength greater than 28 psi.

20. The process according to claim 18, wherein the rigid foam has an in-place density less than about 1.90 pcf.

* * * * *